May 16, 1961    D. A. NEWMAN ET AL    2,984,582
PRESSURE SENSITIVE INK RELEASING TRANSFER
SHEET AND PROCESS OF MAKING SAME
Filed Dec. 22, 1959
Fig. 1 — THERMOPLASTIC RESINOUS INK RELEASING LAYER / FLEXIBLE FOUNDATION
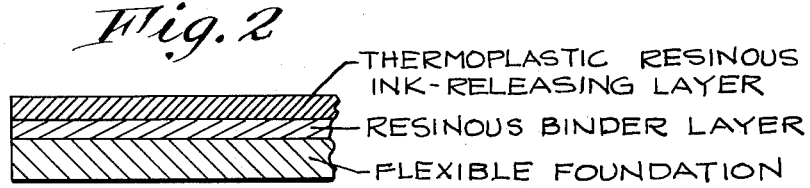
Fig. 2 — THERMOPLASTIC RESINOUS INK-RELEASING LAYER / RESINOUS BINDER LAYER / FLEXIBLE FOUNDATION
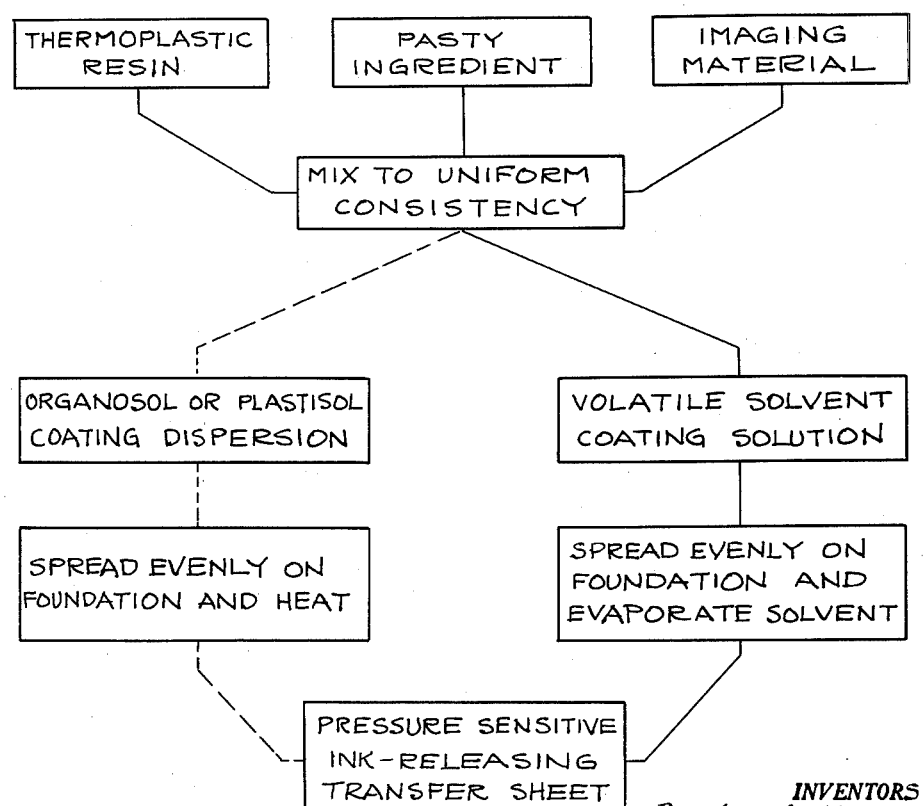
Fig. 3
INVENTORS
Douglas A. Newman
Allan T. Schlotzhauer
BY
Johnson and Kline
ATTORNEYS

United States Patent Office 2,984,582
Patented May 16, 1961

2,984,582
PRESSURE SENSITIVE INK RELEASING TRANSFER SHEET AND PROCESS OF MAKING SAME
Douglas A. Newman, Glen Cove, and Allan T. Schlotzhauer, Locust Valley, N.Y., assignors to Columbia Ribbon and Carbon Manufacturing Co., Inc., Glen Cove, N.Y., a corporation of New York
Filed Dec. 22, 1959, Ser. No. 861,213
14 Claims. (Cl. 117—36)

This invention relates to novel ink-releasing sheets and the method of producing them.

This application is a continuation-in-part of our co-pending applications Serial No. 503,830, filed April 25, 1955, and now abandoned, and Serial No. 632,032, filed January 2, 1957, and now abandoned, the former of which is a continuation of our application Serial No. 374,814, filed August 17, 1953, and issued as U.S. Patent No. 2,820,717 on January 21, 1958.

As noted in said Patent No. 2,820,717, ink compositions for the above purpose heretofore employed have in general been composed of waxes and oils, together with dyes and/or pigments. Carbon papers produced with such compositions have certain disadvantages in that they tend to soften when subjected to high temperatures in warmer climates with resultant sticking of sheets and they tend to harden when subjected to low temperatures in cold climates with resultant decrease in frangibility, these disadvantages given rise to improper writing and allied inconveniences. Furthermore, carbon papers produced with compositions including wax as the solid color carrier mainly give impressions or images by lifting a mass of the wax from the carbon sheet and causing it to adhere to the copy sheet. A mass transfer impression or image of this nature is easily smudged and must be delicately handled to prevent spoiling the copy.

In accordance with the teachings of said patent, new carriers or solid bases for pigments used in the making of carbon papers and the like have been discovered consisting of synthetic polymers, and further it has been found that these polymers which are normally cohesive may be changed in their physical characteristics to form a pressure-transferable film by compounding them with coloring matter and a non-miscible plasticizer or softener which is capable of being retained by the polymer and applying them to the foundation sheet by mixing with one or more volatile liquid solvents which dissolve both said polymer and said softener. The films thus cast are spongy, and while substantially none of the solid binding agent is transferred to the copy sheet, the softener and coloring matter exude to the copy sheet under pressure and are absorbed thereby. Thus the image material is essentially fluent and penetrates into the copy paper like a fabric ribbon ink providing a smudge resistant copy.

Carbon papers produced with compositions according to said patent have technical advantages not possessed by those produced with wax bases heretofore employed, as follows:

(1) They are resistant to heat softening and cold hardening due to normal room temperatures in all climates and are essentially free from any tendency toward increased tackiness or decreased frangibility.

(2) They are also found to have the important property of giving an image which is dense in comparison with its degree of smudginess. With the ordinary wax-base layer the properties of copy cleanliness and good manifolding are not so nearly simultaneously obtainable in a single sheet.

In the practice of the invention of the said patent, however, it became apparent that in spite of the distinct advantages over the customary wax-base transfer layers, room for improvement was offered in that the surfaces of the coatings sometimes had a tendency to "sweat." By this is meant that under general overall pressure or even on standing, some of the softening ingredients used (e.g. vegetable or mineral oil) would tend to migrate to the surface of the coating and appear there as exceedingly minute droplets. This effect tends to limit somewhat the application of the transfer sheet in spite of its otherwise extremely beneficial characteristics. While for many purposes this property would not constitute a severe disadvantage, it will be seen that in certain cases where the transfer material is coated on so-called "one-time" forms and the like, which are stacked or fan-folded so as to be stored in constant contact with adjacent paper sheets, eventual undesirable discoloration of the adjacent sheets occurs.

An object of the present invention, therefore, is to attain the beneficial advantages of the synthetic resin base transfer layer set out in said patent, but in such a way that any tendency to "sweating" is also avoided.

In the drawing:

Figures 1 and 2 are diagrammatic cross sections, to an enlarged scale, of transfer elements according to the present invention, and Fig. 3 is a flow sheet showing alternative processes for preparing transfer elements according to the present invention.

Referring to the drawing, Fig. 1 illustrates a pressure-sensitive element having a flexible foundation sheet carrying a porous ink-releasing layer comprising thermoplastic resin composition. The transfer element shown in Fig. 2 is similar to that of Fig. 1 except that it contains a resinous binder layer to effect improved adhesiveness between the ink-releasing layer and the flexible foundation.

The flow sheet of Fig. 3 illustrates alternative methods for preparing the present transfer sheets. In each method the thermoplastic resin, the pasty ingredient and the imaging material are mixed and ground to a uniform, smooth consistency. This mix is preferably then compounded with a volatile solvent applied to a suitable foundation sheet and allowed to set by evaporation of the solvent to form a transfer element as claimed herein. Alternatively, as shown by the broken lines of Fig. 3, the use of volatile solvents may be completely or partly avoided by compounding the mix in the form of a plastisol or organosol dispersion, applying it to a suitable foundation, heating, and allowing it to cool to form a transfer element as claimed herein.

In carrying out the present invention it has been discovered that the plasticizer or softener used in rendering the synthetic polymer suitable for use in forming a pressure-transferable film should comprise a material of a type which is semi-solid, i.e. which is of a stiff, pasty or form-retentive non-flowable consistency at ordinary room temperatures. As in the forms disclosed in said patent, the softener should also be of the type which is non-volatile to the extent that it is not readily driven off by evaporation and does not dry out or harden under normal conditions of use. It is also essential that the softener, while soluble in the same solvent or mixture of solvents as the synthetic polymer, shall itself be a non-solvent relative to the polymer, i.e. not essentially homogeneously mixable therewith, whereby the softener may form a discontinuous phase when the polymer composition is cast as a film. This latter property of the softener may conveniently be defined as non-miscibility or non-compatability with the synthetic polymer, and these terms will be used hereinafter in this connection.

The semi-solid or pasty softener should be a relatively stiff paste, preferably oil-miscible, which will retain its stiff characteristics up to about 95° F., and will not become excessively hard or stiff at about 60° F. Examples of semi-solid, pasty softening materials suitable as softeners are the animal and vegetable fats which are the esters of the higher fatty acids of animal and vegetable origin. Such materials which may be used are the higher fatty acid glycerides such as lard, tallow, mutton, glyceryl tripalmitate and glyceryl tristearate; cholesteryl esters of higher fatty acids such as lanolin. Also very suitable as semi-solid softeners are the hydrogenated vegetable oils among which may be mentioned hydrogenated cottonseed, rapeseed, peanut and castor oils. Likewise, good results are obtained through the use of semi-solid hydrocarbons such as petrolatum or petroleum jelly. In general, it has been found that any semi-solid material having melting points in excess of room temperature and within the range of from about 30° to about 60° C. may be used provided it meets the qualifications outlined herein.

While the primary softener ingredient is described as being essentially of the pasty variety, it may be used together with a secondary liquid softener which is non-volatile and non-drying. In most cases it is found that if the softening fraction of the composition is made up of a mixture in which the weight of the secondary liquid softener does not exceed the weight of the primary pasty ingredient, the consistency of the softening mixture is such that it is non-flowable at room temperatures, and the properties of the final coating as regards "sweating" will be found most satisfactory. However, the presence of even minor amounts of the paste ingredient are sufficient to prevent severe "sweating" and are therefore within the scope of the present invention. For instance, while a transfer sheet which contains oil, such as mineral oil, as the sole softener will "sweat" and stain a copy sheet in contact therewith at room temperature in a matter of a few hours, the inclusion of as little as 10% by weight of paste ingredient, based upon the total weight of softener used, such as lanolin, materially retards such "sweating" even after several days of contact at room temperature.

As the resinous ink carrier which sets to a porous, spongy layer, unsaturated polymers such as polyvinyl chloride, polyvinyl fluoride, polyvinyl acetates such as Vinylite AYAF, vinyl chloride-vinyl acetate copolymers of the Vinylite series such as Vinylite VYHH and VYLF, polyvinyl butyrals such as Vinylite XYSG, polyacrylic acid, polystyrene, polyvinylidene chloride (Saran), and others; hydrocarbon polymers such as polyethylene and polypropylene, polyurethanes obtained by reacting an isocyanate such as toluene di-isocyanate with a hydroxyl-containing compound such as an alkyd resin or a glycol; polyamides such as alcohol soluble nylon, as well as many others, may be used.

No particular criticality exists in the selection of the pore-forming material but soft vinyl chloride-vinyl acetate copolymers such as Vinylite VYHH are particularly well suited because of their softness, flex strength and excellent adherence for the underlying film.

The pore-forming layer may be applied to the foundation in any desired manner.

In the preferred embodiment, the resinous pore-forming material together with the non-volatile, non-solvent component are dissolved in a suitable solvent such as a 3:1 mixture of ethyl acetate and toluol and the pigment or dye dispersed therein and the mixture ground to a suitable coating viscosity. The mixture is then spread evenly over the foundation sheet by suitable coating apparatus and allowed to cool and harden by evaporation of the volatile ingredients to form a smooth, pressure-transferable ink-releasing sheet of the type disclosed. It has been found advantageous to heat the final sheet for a short time to a temperature of 150° C. or above to fuse the layers and provide a smudge-free product.

It should be understood that the primary pasty ingredient, such as lanolin, etc. may be used as the sole softening component. However, where desired, a secondary liquid softener may be used together with the pasty softener as a mixture consisting of at least 10% by weight of the pasty ingredient. In the selection of the secondary liquid softener suitable as the non-volatile component together with the paste ingredient, one critical requirement must be observed. Such material must be a non-solvent for the resinous pore-forming material, and thus not miscible or compatible therewith. In general, non-volatile mineral, vegetable and animal oils are found most satisfactory, such as mineral oil, neat's-foot oil, refined rapeseed oil, cottonseed oil, peanut oil, castor oil, olive oil, sperm oil, etc. Liquid fatty acids and esters may also be used, such as oleic acid, isopropyl palmitate, diglycol laurate, diglycol oleate and butyl stearate, in combination with the paste ingredient.

In another embodiment of the present invention, the resinous pore-forming material may be compounded and applied using little or no volatile components. For instance, the resinous material such as Vinylite VYHH or VYNC may be suspended as a finely divided dispersion in either an organic liquid vehicle containing minor amounts of a volatile dispersing liquid, in which case the dispersion is called an "organosol," or in a completely non-volatile dispersing liquid, in which case the dispersion is called a "plastisol." Such dispersions may be compounded in any conventional manner and are described by Schildknecht in "Vinyl and Related Polymers," (1952), at page 434 and following. Such dispersions contain a plasticizer such as di-(2-ethylhexyl) phthalate, dioctyl sebacate and dibutoxyethyl phthalate which act as dispersing agents at room temperatures and keep the resin at a coatable consistency and which act as solvents at elevated temperatures over about 150° C. to provide a homogeneous film upon fusion at this temperature.

It has been found that when any of the non-volatile, non-solvent components referred to above, such as the animal and vegetable fats, semi-solid hydrocarbons or hydrogenated vegetable oils, alone or together with the mineral, vegetable and animal oils, are incorporated into such organosols or plastisols, together with coloring matter, and applied to the paper foundation and fused at elevated temperatures, there results, on cooling, the formation of a porous, spongy, ink-releasing element of the same type prepared using volatile solvents. This is important in cases where it is desired to avoid the hazards of using such volatile solvents.

In still another embodiment it has been found particularly useful to employ a binding layer between the foundation sheet and the spongy overlayer to effect improved adhesiveness and to counteract stenciling tendencies where the present ink-releasing elements are used for heavy duty work. The use of such binding layer has been found quite advantageous, for instance, in cases where a heavier-than-normal pressure is exerted in order to produce many copies at one time. It has been found, for instance, that where the spongy overlayer is Vinylite VYHH, an increased attraction of the overlayer for the paper foundation may be effected by first coating the foundation with a thin, homogeneous, continuous layer of Vinylite VYHH which contains no incompatible non-volatile component. Then when a solvent mixture of the spongy overlayer is applied, the solvent partially attacks the binding layer because of its mutual solubility and a strong bond results. Thus, as the component of the binding layer, a homogeneous, continuous film of any of the materials used as the components of the pore-forming layer mentioned prior may be used in the absence of any incompatible non-volatile materials.

Conventional imaging materials which are used in the preparation of carbon papers, typewriter ribbons or hectograph sheets and in the imaging of planographic printing plates may be employed herein. Where the sheet is to be used for imaging planographic plates, known compositions such as nigrosine black and Bismarck brown are used. Where desired, conventional complementary chemical reagents such as gallic acid or iron salts may be used as imaging materials.

Depending upon the synthetic polymer selected, the pigmentary material or coloring matter used, and the particular softening ingredients employed, there will be substantial variations in the proportions of the ingredients which will produce the optimum results. The best proportions will in each case, however, be readily determinable by anyone skilled in the art of carbon ink preparation. As a guide to suitably selecting the proper proportions, it may be pointed out that in most cases, where solvent application is employed, they will lie within the ranges indicated by the following table:

Ingredients: Parts by weight
(1) Synthetic polymer _____ 10.
(2) Softener, usually at least 10% by weight being a pasty, non-volatile, non-drying softener such as lanolin or equivalent, the balance if any being of non-volatile, non-drying oil, and both being non-miscible with the synthetic polymer _____ 7.5 to 35.
(3) Pigment or other coloring matter _____ 3 to 75.
(4) Volatile liquid vehicle, solvent for both (1) and (2) _____ Amount sufficient to render the mixture readily coatable (usually between about 45 and 120).

In cases where the resinous pore-forming material is applied as a ground mixture or slurry, the solvent is dispensed with above and in its place may be used from 0.2–20 parts by weight of plasticizer such as di-(2-ethylhexyl) phthalate, dioctyl sebacate or dibutoxyethyl phthalate.

Illustrative examples of the new composition according to the invention and including the pasty softener in combination with vinyl polymer base are as follows:

*Example I*

Ingredients: Parts by weight
Solid base: Soft vinyl chloride-acetate copolymer (Vinylite VYHH) 85–88% vinyl chloride, 10,000 average apparent molecular weight (Staudinger method) _____ 10
Non-volatile, non-drying softener:
  Lanolin _____ 10
  Mineral oil _____ 8.3
Coloring matter: Alkali blue _____ 8.3
Volatile solvents:
  Toluol _____ 15
  Ethyl acetate _____ 52

*Example II*

Ingredients:
Solid base: Soft vinyl chloride-acetate copolymer (Vinylite VYHH) _____ 10
Non-volatile, non-drying softener:
  Petrolatum _____ 12.2
  Mineral oil _____ 9.8
Coloring matter:
  Carbon black _____ 2.9
  Alkali blue _____ 2.1
Volatile solvents:
  Toluol _____ 13.8
  Ethyl acetate _____ 54.4

*Example III*

Ingredients:
Solid base: Polyvinyl butyral resin (Vinylite XYSG) _____ 6
Non-volatile, non-drying softener:
  Lanolin _____ 6
  Mineral oil _____ 15

Coloring pigents(s) _____ 7.5
Volatile solvents:
  Toluol _____ 20
  Ethyl acetate _____ 53

*Example IV*

Ingredients:
Solid base: Polyvinyl butyral (Vinyl XYSG) __ 10
Non-volatile, non-drying softener:
  Lanolin _____ 16.5
  Mineral oil _____ 13.7
Coloring matter:
  Carbon black _____ 4.2
  Alkali blue _____ 3.1
Volatile solvents:
  Toluol _____ 23.6
  Ethyl acetate _____ 93

*Example V*

Ingredients:
Solid base: Polyvinyl acetate (Vinylite AYAF) 10
Non-volatile, non-drying softener:
  Lanolin _____ 3.2
  Mineral oil _____ 5.2
Coloring matter: Alkali blue _____ 5
Volatile solvents:
  Toluol _____ 7.1
  Ethyl acetate _____ 46.5

*Example VI*

Ingredients:
Solid base: Polyvinyl acetate (Vinylite AYAF) 10
Non-volatile, non-drying softener:
  Lanolin _____ 5.4
  Mineral oil _____ 4.5
Coloring matter:
  Carbon black _____ 1.8
  Alkali blue _____ 1.3
Volatile solvents:
  Toluol _____ 6.8
  Ethyl acetate _____ 46.7

*Example VII*

Ingredients:
Solid base: Soft vinyl (chloride-acetate copolymer (Vinylite VYHH) _____ 10
Non-volatile, non-drying softener:
  Petrolatum _____ 10
  Refined rapeseed oil _____ 8.3
Coloring matter: Alkali blue _____ 8.3
Volatile solvents:
  Toluol _____ 15
  Ethyl acetate _____ 52

*Example VIII*

Ingredients:
Solid base: Soft vinyl (chloride-acetate copolymer (Vinylite VYHH) _____ 10
Non-volatile, non-drying softener:
  Hydrogenated cottonseed oil _____ 8.3
  Mineral oil _____ 10
Coloring matter: Alkali blue _____ 8.3
Volatile solvents:
  Toluol _____ 15
  Ethyl acetate _____ 52

*Example IX*

Ingredients:
Solid base: Soft vinyl chloride-acetate copolymer (Vinylite VYHH) _____ 10
Non-volatile, non-drying softener: Lanolin ____ 22
Coloring matter:
  Carbon black _____ 2.9
  Alkali blue _____ 2.1
Volatile solvents:
  Toluol _____ 13.8
  Ethyl acetate _____ 54.4

The vinyl polymer, softeners and coloring matter are ground together, e.g. in a warm ball mill, until a smooth, uniform consistency is reached. Other colors may be added or substituted as desired, either dry or in oil suspension, to intensify the color or change the hue.

The alkali blue, carbon black or other coloring matters or pigments are preferably first dispersed in at least an equal weight of the mineral oil or other non-volatile, non-drying softener to simplify their addition to the mixture, this softener of course being included in computing the total amount permissible in the mixture as above indicated.

The volatile ingredients which may be any suitable solvents for the vinyl polymer and softener are then added in an amount sufficient to give a composition having suitable viscosity for coating at room temperature, and ground with the mixture to a uniform consistency. The mixture is then spread evenly on a foundation sheet or web by suitable coating apparatus and allowed to cool and to harden by evaporation of the volatile ingredients to form a smooth pressure-transferable carbon coating having the properties described in detail heretofore.

As presently understood, the softening ingredients, which are non-solvents for or non-miscible with the vinyl polymer carrier, are uniformly distributed throughout the vinyl polymer composition, and when the composition is coated upon the foundation sheet, and the volatile components are evaporated, the softening ingredients form a discontinuous phase within the vinyl polymer, thereby forming a cellular or sponge-like film. The coloring matter added to the composition appears to be distributed through the solidified film primarily, although probably not entirely, in the discontinuous phase.

Thus, when an imaging pressure is applied on carbon paper coated with the above compositions, as for instance by a stylus, pencil or other inscribing apparatus, the film of vinyl polymer apparently compresses and releases the softeners and coloring matter in image form to an adjacent copy paper sheet. Accordingly it may be seen that the non-volatile, non-drying softeners function not only to modify the consistency of the vinyl polymer and render the latter suitable as a binder for a pressure-transferable carbon paper coating, but in addition they also function as primary color-carrying vehicles in the coating.

In the manufacture of carbon papers according to this invention, various solvents, semi-solid pasty materials, oils and coloring materials may be used, the essential point of the invention being the discovery that when synthetic polymers are used as the solid base material for the carbon ink, so that the resulting pressure-transferable carbon layers are significantly more heat and smudge-resistant than corresponding wax-base layers, use of a softener of pasty consistency, either alone or together with a liquid softener such as an oil, fatty acid or fatty acid ester, to an extent such that the mixture contains at least 10% by weight of the pasty ingredient, will provide a layer free from the "sweating" tendencies heretofore experienced.

Variations and modifications may be made within the scope of the claims and portions of the improvements may be used without others.

We claim:

1. Process of preparing pressure-sensitive ink-releasing elements which comprises coating a foundation with a layer of resinous composition comprising 10 parts by weight of a thermoplastic resin, from about 7.5 to about 35 parts by weight of a non-volatile component which comprises a pasty ingredient which is semi-solid at room temperature and a non-solvent for the resin and non-compatible therewith, and a quantity of imaging material, and allowing said layer to set whereby is formed as the continuous phase a porous, substantially non-pressure-transferable layer of said resin containing as the discontinuous phase a pressure-transferable mixture of said non-volatile component and imaging material.

2. Process according to claim 1 in which the resinous composition is applied in the form of a solution dissolved in a volatile component and setting of the layer occurs by evaporation of said component.

3. Process according to claim 1 in which the resin is a vinyl resin.

4. Process according to claim 1 in which the semi-solid, pasty ingredient is selected from the group consisting of animal fats, vegetable fats, semi-solid hydrocarbons and hydrogenated vegetable oils.

5. Process according to claim 1 in which the non-volatile component comprises a mixture containing at least 10% by weight of a semi-solid, pasty ingredient and a liquid softener.

6. Process according to claim 5 in which the semi-solid, pasty ingredient is selected from the group consisting of animal fats, vegetable fats, semi-solid hydrocarbons and hydrogenated vegetable oils and the liquid softener is selected from the group consisting of fatty acids, fatty acid esters and oils.

7. Process of preparing pressure-sensitive ink-releasing elements which comprises coating a foundation with an overlayer of a continuous plastic film as an adhesive middle layer, and overcoating said middle layer with a top layer of resinous composition comprising 10 parts by weight of a thermoplastic resin, from about 7.5 to about 35 parts by weight of a non-volatile component which comprises a pasty ingredient which is semi-solid at room temperature and a non-solvent for the resin and non-compatible therewith, a volatile component which is a solvent for said resin and at least a partial solvent for the plastic of said middle layer, and a quantity of imaging material, and allowing said volatile component to evaporate whereby is formed a porous, spongy, ink-releasing element.

8. A pressure-sensitive ink-releasing element comprising a foundation and a layer of porous resin composition thereon, the continuous phase of said composition consisting essentially of 10 parts by weight of a substantially non-pressure-transferable porous thermoplastic resin and the discontinuous phase of said composition comprising from about 7.5 to about 35 parts by weight of a non-volatile, non-drying component which comprises a pasty ingredient which is semi-solid at room temperature and not a solvent for said resin and non-compatible therewith, and a quantity of imaging material.

9. A pressure-sensitive ink-releasing element according to claim 8 in which the non-volatile, non-drying component comprises a mixture containing at least 10% by weight of a semi-solid, pasty ingredient and a liquid softener.

10. A pressure-sensitive ink-releasing element according to claim 8 in which the non-volatile, non-drying component comprises a material selected from the group consisting of animal fats, vegetable fats, semi-solid hydrocarbons and hydrogenated vegetable oils.

11. A pressure-sensitive ink-releasing element according to claim 9 in which the semi-solid, pasty ingredient is selected from the group consisting of animal fats, vegetable fats, semi-solid hydrocarbons and hydrogenated vegetable oils.

12. A pressure-sensitive ink-releasing element according to claim 9 in which the liquid softener is selected from the group consisting of fatty acids, fatty acid esters and oils.

13. A pressure-sensitive ink-releasing element according to claim 9 in which the resin consists of a vinyl resin.

14. A pressure-sensitive ink-releasing element comprising a foundation, a continuous plastic film overlying said foundation as an adhesive middle layer, and a top layer of porous resin composition overlying and adhering to said continuous plastic film, the continuous phase of said porous resin composition consisting essentially of 10 parts by weight of a substantially non-pressure-transferable porous thermoplastic resin and the discontinuous phase of said composition comprising from about 7.5 to about 35 parts by weight of a non-volatile, non-drying component which comprises a pasty ingredient which is semi-solid at room temperature and not a solvent for said resin and non-compatible therewith, and a quantity of imaging material.

References Cited in the file of this patent

UNITED STATES PATENTS

| | | |
|---|---|---|
| 2,777,824 | Leeds | Jan. 15, 1957 |
| 2,820,717 | Newman et al. | Jan. 21, 1958 |
| 2,872,863 | Newman et al. | Feb. 10, 1959 |
| 2,893,890 | Harvey | July 7, 1959 |